(12) United States Patent
Fan et al.

(10) Patent No.: US 12,290,974 B2
(45) Date of Patent: May 6, 2025

(54) BIAXIALLY ORIENTED POLYPROPYLENE FILM FOR HEAT SEALING

(71) Applicant: SABIC GLOBAL TECHNOLOGIES B.V., Bergen Op Zoom (NL)

(72) Inventors: Ling Fan, Geleen (NL); Hongtao Shi, Geleen (NL); Maria Soliman, Geleen (NL); Shan Qin, Geleen (NL); Shengming Cui, Geleen (NL); Priya Garg, Geleen (NL); Jacobus Christinus Josephus Franciscus Tacx, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 880 days.

(21) Appl. No.: 17/285,218

(22) PCT Filed: Oct. 17, 2019

(86) PCT No.: PCT/EP2019/078184
§ 371 (c)(1),
(2) Date: Apr. 14, 2021

(87) PCT Pub. No.: WO2020/083738
PCT Pub. Date: Apr. 30, 2020

(65) Prior Publication Data
US 2022/0001588 A1 Jan. 6, 2022

(30) Foreign Application Priority Data
Oct. 24, 2018 (EP) .................................... 18202274

(51) Int. Cl.
*B29C 48/21* (2019.01)
*B29C 48/00* (2019.01)
*B29C 48/08* (2019.01)
*B29K 23/00* (2006.01)

(52) U.S. Cl.
CPC .......... *B29C 48/21* (2019.02); *B29C 48/0018* (2019.02); *B29C 48/022* (2019.02); *B29C 48/08* (2019.02); *B29K 2023/0608* (2013.01); *B29K 2023/08* (2013.01); *B29K 2023/12* (2013.01); *B29K 2995/0053* (2013.01); *B29K 2995/0063* (2013.01)

(58) Field of Classification Search
CPC ... B29C 48/21; B29C 48/0018; B29C 48/022; B29C 48/08; B29K 2023/0608; B29K 2023/08; B29K 2023/12; B29K 2995/0053; B29K 2995/0063
See application file for complete search history.

(56) References Cited

FOREIGN PATENT DOCUMENTS

| JP | 2017177699 A | 10/2017 |
| JP | 2017177727 A | 10/2017 |
| WO | 9837140 A1 | 8/1998 |
| WO | 0056547 A | 9/2000 |
| WO | 03059599 A1 | 7/2003 |
| WO | 2004060672 A1 | 7/2004 |

OTHER PUBLICATIONS

Machine Translation of Sasaki et al. JP 2017177699 A (Year: 2017).*
International Search Report for International Application No. PCT/EP2019/078184, International Filing Date Oct. 17, 2019, Date of Mailing Nov. 5, 2019, 6 pages.
Written Opinion for International Application No. PCT/EP2019/078184, International Filing Date Oct. 17, 2019, Date of Mailing Nov. 5, 2019, 7 pages.

\* cited by examiner

*Primary Examiner* — Callie E Shosho
*Assistant Examiner* — Bethany M Miller
(74) *Attorney, Agent, or Firm* — CANTOR COLBURN LLP

(57) ABSTRACT

The present invention related to a film comprising multiple co-extruded film layers, the film having a length and a width, and a thickness defined as the dimension of the film perpendicular to the plane defined by the length and the width, wherein the film is a bi-axially oriented film comprising at least a core layer A, having a first and a second surface, and one or two sealing layer(s) B, wherein the core layer A comprises a polypropylene, and wherein the sealing layer B comprises >50.0 wt % of a polyethylene comprising moieties derived from ethylene and moieties derived from an α-olefin comprising 4 to 10 carbon atoms, the polyethylene having a density of ≥870 and ≤920 kg/m³ as determined in accordance with ASTM D1505 (2010), with regard to the total weight of the sealing layer B, wherein the sealing layer B directly adheres to one of the first or second surface of the core layer A. Such film allows for the production of a sealed package having a sufficiently high sealing strength at reduced sealing temperatures, also referred to as the seal initiation temperature.

16 Claims, No Drawings

BIAXIALLY ORIENTED POLYPROPYLENE FILM FOR HEAT SEALING

CROSS REFERENCE TO RELATED APPLICATIONS

This application is a National Stage application of PCT/EP2019/078184, filed Oct. 17, 2019, which claims the benefit of European Application No. 18202274.9, filed Oct. 24, 2018, both of which are incorporated by reference in their entirety herein.

The present invention relates to a biaxially oriented polypropylene film for heat sealing, and to multilayer structures comprising such film. The invention also relates to articles comprising such films.

Films comprising polypropylene materials are abundantly used in a wide variety of applications. A particular example where such polypropylene films find their application is in food packaging. Use of polypropylenes allows for packaging of foodstuff products in a very hygienic manner, contributes to preservation of the packaged products for a prolonged period, and can be done in a very economically attractive way. Further, polypropylene films can be produced with a highly attractive appearance.

A particular type if films that may be produced from polypropylenes are biaxally oriented polypropylene films, also referred to commonly as BOPP films. BOPP films are widely used in for example food packaging applications. Such BOPP films may for example be produced by sequential or simultaneous stretching of a film produced by cast extrusion in both the longitudinal direction and the transverse direction of the film. By so, a film can be produced having a particularly desirable surface area per unit of weight, i.e. a very light film, having very low moisture transmission rate, thus allowing for packing of products with a very long shelf-life, having a desirably inert nature, rendering it suitable for food and pharma packaging, and being processable reliably at very high processing speeds in packaging lines.

An exemplary description of the production of BOPP films can for example be found in WO03/059599-A1, describing a method of production of BOPP films using a so-called tenter frame, wherein the film, subsequent to production via cast extrusion, is subjected to stretching in the machine direction via operation of various rolls that exert a stretching force onto the cast film as a result of the selected speed of the cooperating rolls, and wherein subsequently the film is subjected to an orientation force in the transverse direction.

In many application of BOPP films, it is required that the package, after being provided with the contents to be stored in it, is hermetically sealed, in such way that penetration of gasses or moisture from the environment into the package is minimised or even eliminated. Commonly, this is achieved by heat sealing of the package. In such process, the remaining opening(s) of the package are subjected to thermal energy, either by direct contact heating or by irradiation, so that the side of the film that constitutes the inner side, thus towards the packaged goods, reaches a temperature at which it becomes sufficiently soft so that, upon applying a contacting pressure and reducing the temperature, a thermoplastic seal is formed that seals the packaged contents from the environment.

In order to avoid deterioration of the properties of the polypropylene layer of the BOPP film, it is common practise that a sealing layer is provided onto the polypropylene layer. There is a demand to ensure that the temperature at which the sealing layer of the film becomes sufficiently soft to allow for production of a seal having sufficient strength is reduced.

This has now been achieved according to the present invention by a film comprising multiple co-extruded film layers, the film having a length and a width, and a thickness defined as the dimension of the film perpendicular to the plane defined by the length and the width, wherein the film is a bi-axially oriented film comprising at least a core layer A, having a first and a second surface, and one or two sealing layer(s) B,
wherein the core layer A comprises a polypropylene, and wherein each sealing layer B comprises >50.0 wt % of a polyethylene comprising moieties derived from ethylene and moieties derived from an α-olefin comprising 4 to 10 carbon atoms, the polyethylene having a density of ≥870 and ≤920 kg/m$^3$ as determined in accordance with ASTM D1505 (2010),
wherein each sealing layer B directly adheres to one of the first or second surface of the core layer A.

Such film allows for the production of a sealed package having a sufficiently high sealing strength at reduced sealing temperatures, also referred to as the seal initiation temperature. Where each layer B comprises >50.0 wt % of the polyethylene as defined above, it is believed that this polyethylene forms a matrix rendering the film with the desired sealing properties, even upon orientation being induced upon the film.

It is preferred that the polyethylene that is used in the sealing layer(s) B of the film according to the present invention has a density of ≥880 and ≤915 kg/m$^3$, more preferably of ≥890 and ≤910 kg/m$^3$.

Co-extrusion is a well-established technique for manufacturing films comprising multiple layers of polymeric materials, wherein these layers are thoroughly adhered to each other. This thorough adhesion results from the fact that the materials that constitute the individual layers of the co-extruded film are brought into contact with each other while in molten condition, such as in a film die-head in which multiple molten films that each individually are prepared in a separate melt extruder are combined. One of the further advantages of such co-extrusion processes is that it allows for the production of films comprising multiple layers each having a very small thickness.

The production of the un-oriented film that is used to produce the biaxially oriented film of the present invention may for example be performed by cast extrusion. In a cast extrusion process, typically a film, which may be a co-extruded multi-layer film, is produced by extruding the film in molten condition from a slit-shaped die head onto a multitude of cooling rolls to form an un-oriented film.

In the film according to the present invention, the core layer A preferably has a thickness of ≥60.0%, more preferably ≥80.0%, even more preferably ≥90.0%, with regard to the total thickness of the film. For example, the core layer A may have a thickness of ≥60.0% and ≤98.0%, preferably ≥80.0% and ≤95.0%, more preferably ≥85.0% and ≤95.0%, with regard to the total thickness of the film.

The core layer A may for example be constituted of multiple co-extruded film layers, preferably of multiple co-extruded film layers each having the same material formulation, preferably of three or five co-extruded film layers, preferably of three or five co-extruded film layers each having the same material formulation.

The polypropylene that is used in the core layer A of the film of the present invention may for example be a propylene homopolymer, preferably a propylene homopolymer having a melt mass-flow rate of ≥1.0 and ≤10.0 g/10 min, as determined at 230° C. under a load of 2.16 kg in accordance with ISO 1133 (2011).

Alternatively, the polypropylene that is used in the core layer A of the present invention may for example be a propylene-ethylene copolymer comprising ≤1.0 wt % of moieties derived from ethylene, with regard to the total weight of the propylene-ethylene copolymer.

It is preferred that the polypropylene that is used in the core layer A of the film of the present invention has a quantity of xylene soluble matter in the range of ≥1.0 and ≤6.0 wt %, with regard to the total weight of the polypropylene, wherein the quantity of xylene soluble matter is determined in accordance with ASTM D5492 (2010). The use of a polypropylene having a quantity of xylene soluble matter in this range contributes to a reduction of the haze of the BOPP film.

In the film according to the present invention, the each of the sealing layer (B) preferably has a thickness of ≥2.0% and ≤15.0%, preferably ≥2.0% and ≤12.5%, more preferably ≥5.0% and ≤10.0%, with regard to the total thickness of the film.

The polyethylene that is used in the sealing layer(s) B of the film according to the present invention preferably a melt mass-flow rate, determined at 190° C. under a load of 2.16 kg (MFR2), in accordance with ASTM D1238 (2013), of ≥0.01 and ≤10.00 g/10 min, preferably ≥0.10 and ≤5.00 g/10 min, more preferably ≥0.50 and ≤4.00 g/10 min. For example, the MFR2 at 190° C. may for example be ≥0.50 and ≤2.50 g/10 min, or ≥0.50 and ≤1.50 g/10 min. For example, the MFR2 at 190° C. may for example be ≥2.50 and ≤5.00 g/10 min. Use of such polyethylene allows for manufacturing of films with appropriate melt stability and processability.

In particular, the invention also relates to an embodiment wherein the polyethylene has:
- a fraction of material that is eluted in analytical temperature rising elution fractionation (a-TREF) at a temperature ≤30.0° C. of ≥5.0 wt %, preferably ≥10.0 wt %, with regard to the total weight of the polyethylene;
- a shear storage modulus G' determined at a shear loss modulus G"=5000 Pa of >1000 Pa, G' and G" being determined in accordance with ISO 6721-10 (2015) at 190° C.; and
- a chemical composition distribution broadness (CCDB) of ≥15.0, preferably ≥20.0, wherein the CCDB is determined according to formula I:

$$CCDB = \frac{T_{z+2} - T_{n-2}}{T_{n-2}} * 100 \quad \text{formula I}$$

wherein formula I
$T_{n-2}$ is the moment calculated according to the formula II:

$$T_{n-2} = \frac{\sum \frac{w(i)}{T(i)^2}}{\sum \frac{w(i)}{T(i)^3}} \quad \text{formula II}$$

and
$T_{z+2}$ is the moment calculated according to the formula III:

$$T_{z+2} = \frac{\sum w(i) \cdot T(i)^4}{\sum w(i) \cdot T(i)^3} \quad \text{formula III}$$

wherein
w(i) is the sampled weight fraction in wt % with regard to the total sample weight in a-TREF analysis of a sample (i) taken at temperature T(i), where T(i)>30° C., the area under the a-TREF curve being normalised to surface area=1 for T(i)>30° C.; and
T(i) is the temperature at which sample (i) is taken in a-TREF analysis, in ° C.

The polyethylene that is employed in the sealing layer(s) B of the film according to the present invention preferably has a fraction of material that is eluted in a-TREF at a temperature of ≤30.0° C. of ≥5.0 wt % with regard to the total weight of the polyethylene, preferably ≥7.5 wt %, more preferably ≥10.0 wt %, even more preferably ≥11.5 wt %. Preferably, the polyethylene that is employed in the layer(s) B of the film according to the present invention has a fraction of material that is eluted in a-TREF at a temperature of ≤30.0° C. of ≥5.0 wt % and ≤25.0 wt %, more preferably ≥7.5 wt % and ≤20.0 wt %, even more preferably ≥10.0 wt % and ≤20.0 wt %, even more preferably ≥11.0 wt % and ≤15.0 wt %, with regard to the total weight of the polyethylene. The use of a polyethylene having such a fraction of material that is eluted in a-TREF at a temperature of ≤30.0° C. in the layer(s) B of the film according to the invention contributes to a reduction of the seal initiation temperature.

The polyethylene that is employed in the layer(s) B of the film according to the present invention preferably has a shear storage modulus G' determined at a shear loss modulus G"=5000 Pa of >1000 Pa, preferably >1100 Pa, more preferably >1200 Pa, even more preferably >1300 Pa. The use of a polyethylene having such shear storage modulus G' at a shear loss modulus of 5000 Pa in the layer(s) B of the film according to the invention contributes to improved processability of the film.

According to the invention, analytical temperature rising elution fractionation, also referred to as a-TREF, may be carried out using a Polymer Char Crystaf-TREF 300 equipped with stainless steel columns having a length of 15 cm and an internal diameter of 7.8 mm, with a solution containing 4 mg/ml of sample prepared in 1,2-dichlorobenzene stabilised with 1 g/l Topanol CA (1,1,3-tri(3-tert-butyl-4-hydroxy-6-methylphenyl)butane) and 1 g/l Irgafos 168 (tri(2,4-di-tert-butylphenyl) phosphite) at a temperature of 150° C. for 1 hour. The solution may be further stabilised for 45 minutes at 95° C. under continuous stirring at 200 rpm before analyses. For analyses, the solution was crystallised from 95° C. to 30° C. using a cooling rate of 0.1° C./min. Elution may be performed with a heating rate of 1° C./min from 30° C. to 140° C. The set-up may be cleaned at 150° C. The sample injection volume may be 300 μl, and the pump flow rate during elution 0.5 ml/min. The volume between the column and the detector may be 313 μl. The fraction that is eluted at a temperature of ≤30.0° C. may in the context of the present invention be calculated by subtracting the sum of the fraction eluted >30.0° C. from 100%, thus the total of the fraction eluted ≤30.0° C., and the fraction eluted >30.0° C. to add up to 100.0 wt %.

Particularly, a-TREF may be carried out using a Polymer Char Crystaf-TREF 300 using a solution containing 4 mg/ml of the polymer in 1,2-dichlorobenzene, wherein the solution is stabilised with 1 g/l 1,1,3-tri(3-tert-butyl-4-hydroxy-6- methylphenyl)butane and 1 g/l tri(2,4-di-tert-butylphenyl) phosphite) at a temperature of 150° C. for 1 hour, and further stabilised for 45 minutes at 95° C. under continuous stirring at 200 rpm, wherein the prior to analyses the solution is crystallised from 95° C. to 30° C. using a cooling rate of 0.1° C./min, and elution is performed at a heating rate of 1° C./min from 30° C. to 140° C., and wherein the equipment has been cleaned at 150° C.

For determination of the shear storage modulus G' and the shear loss modulus G", specimens may be used as prepared in accordance with ISO 17855-2 (2016). The DMS measurements were carried out according to ISO 6721-10 (2015) at 190° C. Determination of G' at G"=5000 Pa may be done by preparation of a double-logarithmic Cole-Cole plot of G' and G", where above and below G"=5000 Pa, each 2 data points are to be selected, so in total 4 data points, and a first order line may be determined, where from this line G' at G"=5000 Pa is determined.

The polyethylene that is employed in the layer(s) B of the film according to the present invention preferably has a CCDB of ≥15.0, preferably ≥17.5, more preferably ≥20.0. For example, the polyethylene has a CCDB of ≥15.0 and ≤30.0, preferably ≥17.5 and ≤25.0, more preferably ≥20.0 and ≤25.0. The use of a polyethylene having such CCDB in the layer(s) B of the film according to the invention contributes to an improved seal strength.

It is preferred that the polyethylene comprises ≥70.0 wt % of moieties derived from ethylene, with regard to the total weight of the polyethylene, preferably ≥75.0 wt %, more preferably ≥80.0 wt %. Preferably, the polyethylene comprises ≥70.0 and ≤98.0 wt %, more preferably ≥75.0 and ≤95.0 wt %, even more preferably ≥80.0 and ≤90.0 wt % of moieties derived from ethylene, with regard to the total weight of the polyethylene.

It is further preferred that the polyethylene comprises ≤30.0 wt % of moieties derived from an α-olefin comprising 4-10 carbon atoms, with regard to the total weight of the polyethylene, preferably ≤25.0 wt %, more preferably ≤20.0 wt %. The polyethylene may for example comprise ≥5.0 wt % of moieties derived from an α-olefin comprising 4-10 carbon atoms, with regard to the total weight of the polyethylene, preferably ≥10.0 wt %, more preferably ≥15.0 wt %. For example, the polyethylene may comprise ≥5.0 and ≤30.0 wt % of moieties derived from an α-olefin comprising 4-10 carbon atoms, with regard to the total weight of the polyethylene, preferably ≥10.0 wt % and ≤25.0 wt %, more preferably ≥15.0 and ≤20.0 wt %.

The α-olefin comprising 4-10 carbon atoms may for example be selected from 1-butene, 1-hexene, 4-methyl-1-pentene, and 1-octene, such as from 1-butene, 1-hexene and 1-octene. For example, the α-olefin comprising 4-10 carbon atoms may be selected from 1-hexene and 1-octene. The moieties derived from an α-olefin comprising 4-10 carbon atoms may for example be moieties derived from 1-butene, 1-hexene, 4-methyl-1-pentene, 1-octene, or combinations thereof, preferably from 1-hexene or 1-octene.

The polyethylene that is employed in the layer(s) B of the film according to the present invention may for example comprise ≤30.0 wt % of moieties derived from an α-olefin comprising 4-10 carbon atoms, with regard to the total weight of the polyethylene, preferably ≤25.0 wt %, more preferably ≤20.0 wt %, wherein the α-olefin comprising 4-10 carbon atoms is selected from 1-butene, 1-hexene, 4-methyl-1-pentene, and 1-octene, such as from 1-butene, 1-hexene and 1-octene. The polyethylene may for example comprise ≥5.0 wt % of moieties derived from an α-olefin comprising 4-10 carbon atoms, with regard to the total weight of the polyethylene, preferably ≥10.0 wt %, more preferably ≥15.0 wt %, wherein the α-olefin comprising 4-10 carbon atoms is selected from 1-butene, 1-hexene, 4-methyl-1-pentene, and 1-octene, such as from 1 butene, 1-hexene and 1-octene. For example, the polyethylene may comprise ≥5.0 and ≤30.0 wt % of moieties derived from an α-olefin comprising 4-10 carbon atoms, with regard to the total weight of the polyethylene, preferably ≥10.0 wt % and ≤25.0 wt %, more preferably ≥15.0 and ≤20.0 wt %, wherein the α-olefin comprising 4-10 carbon atoms is selected from 1-butene, 1-hexene, 4-methyl-1-pentene, and 1-octene, such as from 1-butene, 1-hexene and 1-octene.

The layer(s) B of the film according to the present invention may for example comprise >50.0 wt %, or >60.0 wt %, or >70.0 wt %, or >80.0 wt %, or >90.0 wt %, of the polyethylene, with regard to the total weight of the layer. Alternatively, the layer B consists of or essentially consists of the polyethylene.

In the context of the present invention, the embodiment wherein the layer(s) B of the film essentially consist of the polyethylene is to be understood as wherein the layer(s) B of the film consists of the polyethylene and additives known in the art of polyethylene films, such as up to 1.0 wt % of additives, with regard to the total weight of the layer. Suitable additives may for example include UV stabilisers, antioxidants, and processing aids.

The layer(s) B of the film according to the present invention may for example comprise <90.0 wt %, or <80.0 wt %, or <70.0 wt %, or <60.0 wt %, of the polyethylene, with regard to the total weight of the layer. The layer(s) B of the film may comprise for example >50.0 and <90.0 wt % of the polyethylene, or >60.0 wt % and <90.0 wt %, or >60.0 wt % and <85.0 wt %, or >65.0 and <80.0 wt %.

The layer(s) B may for example have a thickness of 0.5-5.0 μm, preferably 0.5-2.5 μm, more preferably 1.0-2.0 μm.

The polyethylene may for example be produced via a solution polymerisation process, preferably by polymerisation of ethylene with 1-hexene and/or 1-octene. The polyethylene may for example be produced using a metallocene-type catalyst, preferably by polymerisation of ethylene with 1-hexene and/or 1-octene.

In certain of its embodiments, the present invention also relates to certain multilayer film structures comprising a film according to the present invention. For example, the invention also relates to a multilayer film structure comprising a film according to the present invention, wherein the film is positioned such in the arrangement of the multilayer film structure that at least one of the outer surfaces of the multilayer film structure is constituted by a layer B. Alternatively, the invention also relates to a multilayer film structure comprising a film according to the present invention, wherein the film is positioned such in the arrangement of the multilayer film structure that both the outer surfaces of the multilayer film structure are constituted by a layer B.

In a further embodiment, the invention relates to a multilayer film structure comprising two outer layers and at least one inner layer positioned between the two outer layers, wherein one of the outer layers is constituted by a layer B, or wherein both outer layers are each constituted by a layer B.

Each sealing layer B may in certain embodiments of the present invention comprise <50.0 wt % of a polypropylene, with regard tot the total weight of the layer B. For example, each sealing layer B may comprise <40.0 wt %, or <35.0 wt % of a polypropylene. For example, each sealing layer B may comprise >10.0 wt % of a polypropylene, or >15.0 wt %, or >20.0 wt %, or <25.0 wt %.

For example, the sealing layer B may comprise >10.0 and <50.0 wt % of a polypropylene, preferably >15.0 and <40.0 wt %, more preferably >20.0 and <35.0 wt %.

For example, the sealing layer B may comprise >50.0 wt % of a polyethylene comprising moieties derived from ethylene and moieties derived from an α-olefin comprising 4 to 10 carbon atoms, the polyethylene having a density of ≥870 and ≤920 kg/m³ as determined in accordance with ASTM D1505 (2010), and <50.0 wt % of a polypropylene, with regard to the total weight of the sealing layer B. Preferably, the sealing layer B comprises >50.0 wt % of a polyethylene comprising moieties derived from ethylene and moieties derived from an α-olefin comprising 4 to 10 carbon atoms, the polyethylene having a density of ≥870 and ≤920 kg/m³ as determined in accordance with ASTM D1505 (2010), and <50.0 wt % of a polypropylene, with regard to the total weight of the sealing layer B, wherein the sealing layer B does not comprise any further polyolefins other than the polyethylene and the polypropylene.

The polypropylene in layer B may for example be a polypropylene homopolymer or a polypropylene copolymer. For example, the polypropylene may be a random copolymer of propylene with ethylene, for example a random copolymer of propylene with ≥1.0 wt % and ≤10.0 wt % of ethylene, with regard to the total weight of the copolymer.

Alternatively, the polypropylene in layer B may be a terpolymer of propylene with ethylene and a further olefin selected from 1-butene, 1-hexene, and 1-octene. For example, the polypropylene may be a terpolymer of propylene with ethylene and 1-butene. For example, the polypropylene may be a terpolymer of propylene with >1.0 and <10.0 wt % of ethylene and >1.0 and <10.0 wt % of a further olefin selected from 1-butene, 1-hexene and 1-octene, with regard to the total weight of the polypropylene. Preferably, the polypropylene is a terpolymer of propylene with >2.0 and <8.0 wt % of ethylene and >2.0 and <8.0 wt % of a further olefin selected from 1-butene, 1-hexene and 1-octene, with regard to the total weight of the polypropylene. More preferably, the polypropylene is a terpolymer of propylene with >3.0 and <6.0 wt % of ethylene and >3.0 and <6.0 wt % of a further olefin selected from 1-butene, 1-hexene and 1-octene, with regard to the total weight of the polypropylene.

For example, the polypropylene in layer B may be a terpolymer of propylene with >1.0 and <10.0 wt % of ethylene and >1.0 and <10.0 wt % of 1-butene, with regard to the total weight of the polypropylene. Preferably, the polypropylene is a terpolymer of propylene with >2.0 and <8.0 wt % of ethylene and >2.0 and <8.0 wt % of 1-butene, with regard to the total weight of the polypropylene. More preferably, the polypropylene is a terpolymer of propylene with >3.0 and <6.0 wt % of ethylene and >3.0 and <6.0 wt % of 1-butene, with regard to the total weight of the polypropylene.

The polypropylene in layer B may for example have a density of >860 and <930 kg/m³, preferably >880 and <915 kg/m³, more preferably >890 and <910 kg/m³, as determined in accordance with ISO 1183-1 (2012), method A. The polypropylene may for example have a melt mass flow rate as determined in accordance with ISO 1133 (2011) at 230° C. under a load of 2.16 kg of >1.0 and <10.0 g/10 min, preferably >2.0 and <8.0 g/10 min, more preferably >4.0 and <6.0 g/10 min.

The polypropylene in layer A may be a polypropylene homopolymer or a copolymer of propylene and <5.0 wt %, preferably >0.5 and <3.0 wt % of ethylene, with regard to the total weight of the polypropylene. The polypropylene in layer A may for example have a melt mass flow rate as determined in accordance with ISO 1133 (2011) at 230° C. under a load of 2.16 kg of >1.0 and <10.0 g/10 min, preferably >2.0 and <8.0 g/10 min, more preferably >2.5 and <5.0 g/10 min.

In a certain embodiment, the present invention relates to a film comprising multiple co-extruded film layers, the film having a length and a width, and a thickness defined as the dimension of the film perpendicular to the plane defined by the length and the width, wherein the film is a bi-axially oriented film comprising at least a core layer A, having a first and a second surface, and one or two sealing layer(s) B, wherein the core layer A comprises a polypropylene, and wherein the sealing layer B comprises >50.0 wt %, preferably >60.0 and <80.0 wt % of a polyethylene comprising moieties derived from ethylene and moieties derived from an α-olefin comprising 4 to 10 carbon atoms, the polyethylene having a density of ≥870 and ≤920 kg/m³ as determined in accordance with ASTM D1505 (2010), with regard to the total weight of the sealing layer B, and <50.0 wt %, preferably >20.0 and <40.0 wt % of a polypropylene, wherein the polypropylene is a terpolymer of propylene with >1.0 and <10.0 wt % of ethylene and >1.0 and <10.0 wt % of 1-butene, with regard to the total weight of the polypropylene wherein the sealing layer B directly adheres to one of the first or second surface of the core layer A.

In a certain further embodiment, the present invention relates to a film comprising multiple co-extruded film layers, the film having a length and a width, and a thickness defined as the dimension of the film perpendicular to the plane defined by the length and the width, wherein the film is a bi-axially oriented film comprising at least a core layer A, having a first and a second surface, and one or two sealing layer(s) B, wherein the core layer A comprises a polypropylene, and wherein the sealing layer B comprises >50.0 wt %, preferably >60.0 and <80.0 wt % of a polyethylene comprising moieties derived from ethylene and moieties derived from an α-olefin comprising 4 to 10 carbon atoms, the polyethylene having a density of ≥870 and ≤920 kg/m³ as determined in accordance with ASTM D1505 (2010), with regard to the total weight of the sealing layer B, and <50.0 wt %, preferably >20.0 and <40.0 wt % of a polypropylene, wherein the polypropylene is a terpolymer of propylene with >1.0 and <10.0 wt % of ethylene and >1.0 and <10.0 wt % of 1-butene, with regard to the total weight of the polypropylene wherein the sealing layer B directly adheres to one of the first or second surface of the core layer A, and wherein the sealing layer B does not comprise any further polyolefins other than the polyethylene and the polypropylene.

In a yet further embodiment, the invention relates to a film comprising multiple co-extruded film layers, the film having a length and a width, and a thickness defined as the dimension of the film perpendicular to the plane defined by the length and the width, wherein the film is a bi-axially oriented film comprising at least a core layer A, having a first and a second surface, and one or two sealing layer(s) B, wherein the core layer A comprises a polypropylene, and wherein the sealing layer B comprises >50.0 wt %, preferably >60.0 and <80.0 wt % of a polyethylene comprising moieties derived from ethylene and moieties derived from an α-olefin comprising 4 to 10 carbon atoms, the polyethylene having a density of ≥870 and ≤920 kg/m$^3$ as determined in accordance with ASTM D1505 (2010), with regard to the total weight of the sealing layer B, and <50.0 wt %, preferably >20.0 and <40.0 wt % of a polypropylene, wherein the polypropylene is a terpolymer of propylene with >1.0 and <10.0 wt % of ethylene and >1.0 and <10.0 wt % of 1-butene, with regard to the total weight of the polypropylene wherein the sealing layer B directly adheres to one of the first or second surface of the core layer A, and wherein the polyethylene has:
- a fraction of material that is eluted in analytical temperature rising elution fractionation (a-TREF) at a temperature ≤30.0° C. of ≥5.0 wt %, preferably ≥10.0 wt %, with regard to the total weight of the polyethylene;
- a shear storage modulus G' determined at a shear loss modulus G"=5000 Pa of >1000 Pa, G' and G" being determined in accordance with ISO 6721-10 (2015) at 190° C.; and
- a chemical composition distribution broadness (CCDB) of ≥15.0, preferably ≥20.0, wherein the CCDB is determined according to formula I:

$$CCDB = \frac{T_{z+2} - T_{n-2}}{T_{n-2}} * 100 \quad \text{formula I}$$

wherein $T_{n-2}$ is the moment calculated according to the formula II:

$$T_{n-2} = \frac{\sum \frac{w(i)}{T(i)^2}}{\sum \frac{w(i)}{T(i)^3}} \quad \text{formula II}$$

and $T_{z+2}$ is the moment calculated according to the formula III:

$$T_{z+2} = \frac{\sum w(i) \cdot T(i)^4}{\sum w(i) \cdot T(i)^3} \quad \text{formula III}$$

wherein w(i) is the sampled weight fraction in wt % with regard to the total sample weight in a-TREF analysis of a sample (i) taken at temperature T(i), where T(i) >30° C., the area under the a-TREF curve being normalised to surface area=1 for T(i) >30° C.; and T(i) is the temperature at which sample (i) is taken in a-TREF analysis, in ° C.

The multilayer film structure may for example comprise 3-15 layers, preferably 3-11 layers, more preferably 3-7 layers. The multilayer film structure may for example comprise 3 layers, or 5 layers, or 7 layers.

The multilayer film structure may for example have a thickness of 2-150 μm, preferably 10-100 μm, more preferably 15-75 μm.

The film may for example be oriented to a degree of ≥5.0 in the length direction and ≥5.0 in the width direction, with regard to the length and width of the film prior to subjecting the film to bi-axial orientation, wherein the degree of orientation is the ratio of either of the length or the width after orientation versus before orientation. For example, the film may be oriented to a degree of ≥5.0 and ≤15.0 times in the length direction and ≥5.0 and ≤15.0 in the width direction. For example, the film be oriented to a degree of ≥5.0 and ≤10.0 in the length direction and ≥5.0 and ≤10.0 in the width direction.

In a particular embodiment, the present invention also relates to a process for production of a bi-axially oriented film according to the invention, comprising the steps in this order of:
(a) preparing a film via continuous melt extrusion;
(b) subjecting the film obtained in step (a) to an orientation in the machine direction to obtain a film having degree of orientation in the length direction of ≥5.0, wherein the orientation in the machine direction occurs at a temperature in the range of 150-170° C., wherein the degree of orientation is the ratio of the length of the film after step (b) versus the length of the film obtained in step (a);
(c) subjecting the film obtained in step (b) to an orientation in the transverse direction to obtain a film having a degree of orientation in the width direction of ≥5.0, wherein the orientation in the transverse direction occurs at a temperature of 150-170° C., wherein the degree of orientation is the ratio of the width of the film after step (c) versus the width of the film obtained in step (a).

Particularly preferably, the step (a) involves co-extrusion of the core layer A and one or two sealing layer(s) B, preferably co-extrusion of the core layer A and two sealing layers B.

The co-extrusion may preferably involve extrusion of a core layer A comprising one or more layers, each layer provided by a separate melt extruder, providing a first sealing layer B on one side of the core layer A, and a second sealing layer B on the other side of the core layer A, wherein each layer B is provided by a separate melt extruder, wherein each of the layers constituting core layer A and each of the sealing layers B are contacted with each other in molten condition upon exiting the respective melt extruders to form a co-extruded multi-layer film.

The invention in one of its embodiments also relates to an article comprising a film according the invention, or a film produced according to the process of the invention.

In a particular embodiment, the invention also relates to a process for preparing an article comprising a sealed film, the process comprising the steps in this order of:
providing a film or a multilayer film structure according to the invention;
providing an object comprising a surface for sealing with the film or the multilayer film structure;
arranging the film or multilayer film structure and the object so that a layer A of the film or the multilayer film structure and the surface for sealing of the object can be brought into contact with each other;
contacting the film and the surface for sealing at a temperature of ≥60 and ≤80° C., during a time of 1-5 seconds, under application of a pressure of ≥0.3 N/mm$^2$ to obtain a heat-sealed article.

The invention also relates to an article comprising a film sealed to a surface, wherein the article comprises a film or a multilayer film structure according to the invention, or wherein the article is produced according to the process according to the invention. For example, such article may be a package for containing foodstuffs, or a package containing foodstuffs.

The invention will now be illustrated by the following non-limiting examples.

In the experiments conducted in the course of the present invention, the following materials were used.

| | |
|---|---|
| h-PP | SABIC PP 521P, a propylene homopolymer having an MFR2 at 230° C. of 3.0 g/10 min, obtainable from SABIC. |
| t-PP | Adsyl 5 C39F, a terpolymer of propylene with ethylene and 1-butene, obtainable from LyondellBasell |
| 8402 | SABIC COHERE 8402, an ethyle-1-octene copolymer produced by solution polymerisation using a metallocene catalyst, having an MFR2 at 190° C. of 3.5 g/10 min and a density of 905 kg/m$^3$, comprising 16.0 wt % 1-octene, obtainable from SABIC, having a G' at G" = 5000 Pa of 783 Pa, a CCDB of 18.6, and a fraction eluted in a-TREF at ≤30.0° C. of 4.6 wt %. |
| S100 | SABIC COHERE S100, an ethyle-1-octene copolymer produced by solution polymerisation using a metallocene catalyst, comprising 19.8 wt % 1-octene, having an MFR2 at 190° C. of 1.0 g/10 min and a density of 900 kg/m$^3$, obtainable from SABIC, having a G' at G" = 5000 Pa of 1372 Pa, a CCDB of 20.8, and a fraction eluted in a-TREF at ≤30.0° C. of 10.8 wt %. |

Using these materials, films were produced according to the following formulations for the sealing layers:

Sealing Layer B Formulations

| | Formulation | | |
|---|---|---|---|
| Experiment | t-PP | 8402 | S100 |
| 1 | | 100.0 | |
| 2 | | | 100.0 |
| 3 | 30.0 | | 70.0 |
| 4 | 50.0 | | 50.0 |
| 5 | 70.0 | | 30.0 |
| 6 | 100.0 | | |

The weight values in the table above represent weight % of each component with regard to the total weight of the material in the formulation for the sealing layer B.

With the above sealing layer formulations, a number of films were produced via both biaxial orientation processing (BOPP films) and cast processing (cast films).

The BOPP films were produced via multi-layer cast extrusion at 230° C. to form films having a thickness of 1200 μm, consisting of a first layer B, a second layer B, and a core layer A, wherein the core layer was positioned between the first and the second layer B. The core layer A was produced of the h-PP, and had a thickness of 1080 μm. Each layer B had a thickness of 60 μm. The films were stretched first in the machine direction (MD) to a stretching degree of 5 at a temperature of 165° C., and subsequently in the transverse direction (TD) to a stretching degree of 7.5 at a temperature of 170° C., to obtain films having a thickness of 25.0 μm, having a structure of a first and a second layer B of each 1.25 μm thickness, between which a core layer A having a thickness of 22.5 μm is sandwiched.

The cast films were produced using an OCS cast film cast extruder, to obtain films of sealing layer B material having a thickness of 50 μm.

The films produced as per the above processes were each subjected to analysis and testing, as described below.

| | OCS film | | | BOPP film | | | | |
|---|---|---|---|---|---|---|---|---|
| Experiment | SIT | T2.0 | T3.0 | SIT | T2.0 | T3.0 | Haze | Gloss |
| 1 | | | | 84 | 89 | 102 | 1.5 | 87 |
| 2 | 68 | 80 | 82 | 80 | 84 | 87 | 1.5 | 88 |
| 3 | 85 | 92 | 96 | 75 | 80 | 82 | 2.5 | 81 |
| 4 | 92 | 96 | 97 | 102 | 110 | 113 | 26.0 | 23 |
| 5 | 100 | 106 | 108 | 104 | 112 | 114 | 6.0 | 58 |
| 6 | | | | 105 | 106 | 107 | 2.0 | 81 |

The film of experiments 1-3 represent the present invention, experiments 4-6 are included for comparative purposes.

The SIT as presented in the table above indicates the Seal Initiation Temperature, in ° C., defined in the context of the present invention as the temperature at which a seal strength of 0.5 N/15 mm was obtained. T2.0 is the temperature at which a seal strength of 2.0 N/15 mm was obtained; T3.0 the temperature at which a seal strength of 3.0 N/15 mm was obtained. The seal strength was determined in accordance with ASTM F88 (2015), method C, wherein the films were conditioned at room temperature for 72 hours, and sealed to a second film of the same material, such that the seal was formed by two adjacent layers B of two connecting films, each of 15 mm width, by applying a force of 450N and a dwell time of 1.0 second, using a Brugger HSG-C seal machine. Separation testing was done at a rate of 200 mm/min; width and length of the seal bar were 10 mm*150 mm. The sealing temperature was varied between 60 and 130° C.

The gloss was determined in accordance with ASTM D2457 (2013) as specular gloss at 45° gloss angle, expressed in gloss units (GU). The haze was determined in accordance with ASTM D1003 (2013), expressed in %.

The above presented results show that the film according to the invention demonstrates a reduced seal initiation temperature, while maintaining desired haze and gloss. In the case of experiment 3, it can be observed that the seal strength of the stretched film (the BOPP film) is even higher than that of the cast film made of the same seal material.

The invention claimed is:

1. A film comprising multiple co-extruded film layers, the film having a length and a width, and a thickness defined as the dimension of the film perpendicular to the plane defined by the length and the width,
    wherein the film is a bi-axially oriented film comprising at least a core layer A, having a first and a second surface, and one or two sealing layer(s) B,
    wherein the core layer A comprises a polypropylene,
    wherein each of the one or two sealing layer(s) B comprises >50.0 wt % of a polyethylene comprising moieties derived from ethylene and moieties derived from an α-olefin comprising 4 to 10 carbon atoms, the polyethylene having a density of ≥870 and ≤920 kg/m³ as determined in accordance with ASTM D1505 (2010), with regard to the total weight of each of the one or two sealing layer(s) B, wherein each of the one or two sealing layer(s) B directly adheres to one of the first or second surface of the core layer A, and wherein the polyethylene has:
- a fraction of material that is eluted in analytical temperature rising elution fractionation (a-TREF) at a temperature ≤30.0° C. of ≥5.0 wt %, with regard to the total weight of the polyethylene;
- a shear storage modulus G' determined at a shear loss modulus G"=5000 Pa of >1000 Pa, G' and G" being determined in accordance with ISO 6721-10 (2015) at 190° C.; and
- a chemical composition distribution broadness (CCDB) of ≥15.0, wherein the CCDB is determined according to formula I:

$$CCDB = \frac{T_{z+2} - T_{n-2}}{T_{n-2}} * 100 \qquad \text{formula I}$$

wherein
$T_{n-2}$ is the moment calculated according to the formula II:

$$T_{n-2} = \frac{\sum \frac{w(i)}{T(i)^2}}{\sum \frac{w(i)}{T(i)^3}} \qquad \text{formula II}$$

and
$T_{z+2}$ is the moment calculated according to the formula III:

$$T_{z+2} = \frac{\sum w(i) \cdot T(i)^4}{\sum w(i) \cdot T(i)^3} \qquad \text{formula III}$$

wherein
w(i) is the sampled weight fraction in wt % with regard to the total sample weight in a-TREF analysis of a sample (i) taken at temperature T(i), where T(i) >30° C., the area under the a-TREF curve being normalised to surface area=1 for T (i) >30° C.; and T (i) is the temperature at which sample (i) is taken in a-TREF analysis, in ° C.

2. The film according to claim 1, wherein each of the one or two sealing layer(s) B further comprises <50.0 wt % of a polypropylene, with regard to the total weight of each of the sealing layer(s) B.

3. The film according to claim 2, wherein the polypropylene in each of the one or two sealing layer(s) B is a terpolymer of propylene with >1.0 and <10.0 wt % of ethylene and >1.0 and <10.0 wt % of a further olefin selected from 1-butene, 1-hexene and 1-octene, with regard to the total weight of the polypropylene.

4. The film according to claim 1, wherein the core layer A has a thickness of ≥60.0%, with regard to the total thickness of the film.

5. The film according to claim 1, wherein the core layer A is constituted of multiple co-extruded film layers.

6. The film according to claim 1, wherein the polypropylene in the core layer A is a propylene homopolymer.

7. The film according to claim 1, wherein each of the one or two sealing layer(s) B has a thickness of ≥2.0% and ≤15.0% with regard to the total thickness of the film.

8. The film according to claim 1, wherein the film is oriented to a degree of ≥5.0 in the length direction and ≥5.0 in the width direction, with regard to the length and width of the film prior to subjecting the film to bi-axial orientation, wherein the degree of orientation is the ratio of either of the length or the width after orientation versus before orientation.

9. The film according to claim 1, wherein the α-olefin is selected from 1-butene, 1-hexene and 1-octene.

10. The film according to claim 1, wherein each of the one or two sealing layer(s) B comprises ≥60.0 wt % of the polyethylene, with regard to the total weight of each of the one or two sealing layer(s) B.

11. A process for production of the film according to claim 1, comprising the steps in this order of:
(a) preparing the film via continuous melt extrusion;
(b) subjecting the film obtained in step (a) to an orientation in the machine direction to obtain a film having degree of orientation in the length direction of ≥5.0, wherein the orientation in the machine direction occurs at a temperature in the range of 150-170° C., wherein the degree of orientation is the ratio of the length of the film after step (b) versus the length of the film obtained in step (a);
(c) subjecting the film obtained in step (b) to an orientation in the transverse direction to obtain a film having a degree of orientation in the width direction of ≥5.0, wherein the orientation in the transverse direction occurs at a temperature of 150-170° C., wherein the degree of orientation is the ratio of the width of the film after step (c) versus the width of the film obtained in step (a).

12. The process according to claim 11, wherein step (a) involves co-extrusion of the core layer A and the one or two sealing layer(s) B.

13. The process according to claim 12, wherein the co-extrusion involves extrusion of the core layer A comprising one or more layers, each layer provided by a separate melt extruder, providing a first sealing layer B on one side of the core layer A, and a second sealing layer B on the other side of the core layer A, wherein each of the sealing layers B is provided by a separate melt extruder, wherein each of the layers constituting core layer A and each of the sealing layers B are contacted with each other in molten condition upon exiting the respective melt extruders to form a co-extruded multi-layer film.

14. An article comprising the film according to claim 1.

15. The film according to claim 1, wherein the polypropylene in the core layer A is a propylene homopolymer having a melt mass-flow rate of ≥1.0 and ≤10.0 g/10 min, as determined at 230° C. under a load of 2.16 kg in accordance with ISO 1133 (2011).

16. The film according to claim 1, wherein the α-olefin is 1-octene.

* * * * *